US011614053B2

(12) United States Patent
Qureshi et al.

(10) Patent No.: US 11,614,053 B2
(45) Date of Patent: Mar. 28, 2023

(54) SUPERSONIC TURBOFAN ENGINE

(71) Applicants: Sarah Qureshi, Lahore (PK); Masood Latif Qureshi, Islamabad (PK)

(72) Inventors: Sarah Qureshi, Lahore (PK); Masood Latif Qureshi, Islamabad (PK)

(73) Assignee: Sarah Qureshi, Lahore (PK)

( * ) Notice: Subject to any disclaimer, the term of this patent is extended or adjusted under 35 U.S.C. 154(b) by 0 days.

(21) Appl. No.: 17/357,577

(22) Filed: Jun. 24, 2021

(65) Prior Publication Data

US 2021/0324817 A1 Oct. 21, 2021

(51) Int. Cl.
*F02K 7/16* (2006.01)
*F02C 6/20* (2006.01)
*F02K 3/04* (2006.01)
*F02K 3/105* (2006.01)

(52) U.S. Cl.
CPC .................. *F02K 7/16* (2013.01); *F02C 6/20* (2013.01); *F02K 3/04* (2013.01); *F02K 3/105* (2013.01); *F05D 2220/323* (2013.01)

(58) Field of Classification Search
CPC ........ F02K 3/04–065; F02K 3/08; F02K 3/10; F02K 3/11; F02K 3/105; F02K 7/16
See application file for complete search history.

(56) References Cited

U.S. PATENT DOCUMENTS

| | | | | |
|---|---|---|---|---|
| 2,832,192 A * | 4/1958 | Budish | ....................... | F02C 3/08 60/269 |
| 2,968,146 A * | 1/1961 | Howell | ..................... | F02K 7/16 60/262 |
| 3,153,904 A * | 10/1964 | Ellis | ........................ | F02K 3/075 60/263 |
| 3,238,716 A * | 3/1966 | Sandre | ..................... | F02K 3/075 60/268 |
| 3,811,791 A * | 5/1974 | Cotton | .................. | B64C 23/005 416/129 |
| 4,315,401 A | 2/1982 | Beal et al. | | |
| 4,909,031 A * | 3/1990 | Grieb | ........................ | F02K 7/16 60/225 |
| 5,074,118 A * | 12/1991 | Kepler | ..................... | F02K 3/04 60/226.3 |
| 7,140,174 B2 * | 11/2006 | Johnson | .................... | F02K 7/16 60/262 |

(Continued)

FOREIGN PATENT DOCUMENTS

EP 1267062 B1 9/2004
EP 1643113 A2 4/2006

OTHER PUBLICATIONS

Search Report from Intellectual Property Office of the UK dated Aug. 10, 2020.

*Primary Examiner* — Alain Chau

(57) ABSTRACT

A gas turbine engine designed to take-off and land as a conventional turbofan engine at subsonic speeds and accelerate to supersonic speeds during flight by converting into a hybrid turbojet and ramjet engine. This is achieved by introducing an afterburner in the bypass duct of the engine and by retracting the bypass fan backward into a cylinder. This operation is carried out before the aircraft enters the transonic regime, at any stage below Mach 1. At supersonic speed, the shock wave is deflected through a needle cone that is projected out of the nose of the engine in order to prevent the intake air from being choked.

21 Claims, 6 Drawing Sheets

(56) References Cited

U.S. PATENT DOCUMENTS

| | | | | |
|---|---|---|---|---|
| 8,429,893 | B2* | 4/2013 | Rupp | F01D 5/02 |
| | | | | 60/225 |
| 8,490,402 | B2* | 7/2013 | Lains | F23R 3/20 |
| | | | | 60/761 |
| 10,711,791 | B1* | 7/2020 | Rolling | F02C 3/13 |
| 10,814,959 | B2* | 10/2020 | Cheung | B64D 27/24 |
| 11,041,463 | B1* | 6/2021 | Weiss | F02K 3/04 |
| 11,167,845 | B2* | 11/2021 | Schank | B64D 35/02 |
| 2006/0064960 | A1* | 3/2006 | Johnson | F02C 7/042 |
| | | | | 60/226.3 |
| 2010/0218505 | A1* | 9/2010 | Lains | F02C 7/266 |
| | | | | 60/765 |
| 2011/0036067 | A1* | 2/2011 | Rupp | F02C 7/042 |
| | | | | 60/226.1 |
| 2014/0224940 | A1 | 8/2014 | Rybalko et al. | |
| 2018/0093754 | A1* | 4/2018 | Cheung | B64D 27/24 |
| 2020/0017229 | A1* | 1/2020 | Steinert | B64D 27/20 |
| 2020/0062382 | A1* | 2/2020 | Schank | F02C 7/04 |
| 2020/0231293 | A1* | 7/2020 | Parsons | F02K 3/06 |
| 2021/0164416 | A1* | 6/2021 | Weiss | F02K 3/11 |
| 2022/0194619 | A1* | 6/2022 | Steinert | B64D 35/02 |

\* cited by examiner

SUPERSONIC TURBOFAN ENGINE

PRIORITY

This application claims the benefit of priority from UK Application No. GB2009686.3, filed on Jun. 25, 2020, at the Intellectual Property Office of the United Kingdom, and entitled "A Supersonic Turbofan engine," which is incorporated herein by reference in its entirety.

TECHNICAL FIELD

This invention relates to a system for a supersonic turbo fan engines and more particularly to a supersonic gas turbine engines.

BACKGROUND

Supersonic aircraft are fairly common in the military domain and their use has been limited to occasional supersonic dashes at the cost of high fuel consumption. However, the use of supersonic engines and aircraft in the commercial segment has been limited with only one particular example of the Concorde found in history that was in service for around twenty seven years before being grounded. The rationale behind its discontinuity was the limitation imposed on airport and ground noise generated by aircraft engines during take-off and landing. The excessive fuel consumption also made its operations questionable.

However, with the advancements in material technology and simulation techniques, there has been a revival of interest in supersonic flights, since time has become more valuable over the years and with the world becoming a global village, there exists a market for unrestricted fast travel. The contemporary approach is to develop supersonic executive business jets as per the demands forecasted by market study.

In that context, the invention is a novel supersonic jet engine that can comply with current aircraft noise standards and can also achieve high performance of the engine during flight. The invention is based on integrating several concepts of the physics of propulsion into a single engine in order to achieve the best possible engine configuration at a given set of fight conditions. Flight conditions vary according to the different segments of the flight mission.

The design is also applicable to the new generation of environment friendly aircraft engine configurations that aim to reduce aviation induced noise pollution and optimize fast travel while reducing fuel emissions by enhancing engine efficiency.

Our present invention involves a retractable geometry for a standard turbofan core such that the engine takes-off and lands in a turbofan configuration and then for the purpose of accelerating to supersonic speeds, burns fuel in an afterburner which has been introduced in the bypass duct of the turbo fan instead of the afterburner being installed in the core of the exhaust as in current aircraft in use. Just after igniting the afterburner, the bypass fan is retracted into a backward cylinder to remove obstruction to high speed flow. The engine then operates on the principles of ramjet propulsion. A shock deflecting needle is added as a permanent geometry fixture at the nose of the engine or the fan hub to prevent the choking of the engine due to the shock waves generated at supersonic speeds such that the supersonic airflow enters the engine smoothly. Prior art does not introduce any invention whereby an afterburner is introduced in the bypass of a turbofan engine as well as any reference to the backward retraction of the fan of the turbofan engine for the purpose.

SUMMARY

An object of the invention is to provide new and improved methods and systems from a subject's head. The following presents a simplified summary of exemplary embodiments of the present disclosure in order to provide a basic understanding of some aspects described herein. This summary is not an extensive overview of the claimed subject matter. It is intended to neither identify key nor critical elements of the claimed subject matter nor delineate the scope of the subject innovation. Its sole purpose is to present some concepts of the claimed subject matter.

In an exemplary embodiment, an exemplary n engine whereby an afterburner is introduced in the bypass duct of a turbofan engine in order to combust the bypass air and the bypass fan is disengaged from the core shaft and is retracted into a cylinder during any stage of flight for the purpose of accelerating from subsonic speed to supersonic speed along with a shock deflector needle attached to the hub of the engine and the mechanism of fan retraction is reversed and the afterburner is switched off when the engine needs to fly at subsonic speed again.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the present disclosure will now be illustrated by way of example. It is expressly understood, however, that the drawings are for the purpose of illustration and description only and are not intended as a definition of the limits of the present disclosure. Embodiments of the present disclosure will now be described by way of example in association with the accompanying drawings in which:

FIG. 1 is a turbofan engine, consistent with one or more exemplary embodiments of the present disclosure;

DETAILED DESCRIPTION

The novel features which are believed to be characteristic of the present invention, as to its structure, organization, use and method of operation, together with further objectives and advantages thereof, will be better understood from the following discussion.

As a preliminary matter, some of the figures describe concepts in the context of one or more structural components, variously referred to as functionality, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. The figures discussed below provide details regarding exemplary systems that may be used to implement the disclosed functions.

As to terminology, the phrase "configured to" encompasses any way that any kind of functionality can be constructed to perform an identified operation. The functionality can be configured to perform an operation using, for instance, software, hardware, firmware and the like, or any combinations thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

An aircraft with an airframe suitable to supersonic flight is fitted with one, two, three or four of the invention that are the propulsion device of the aircraft and hence called the engine. The invention has the core schematics of a turbofan engine.

Figure 1:
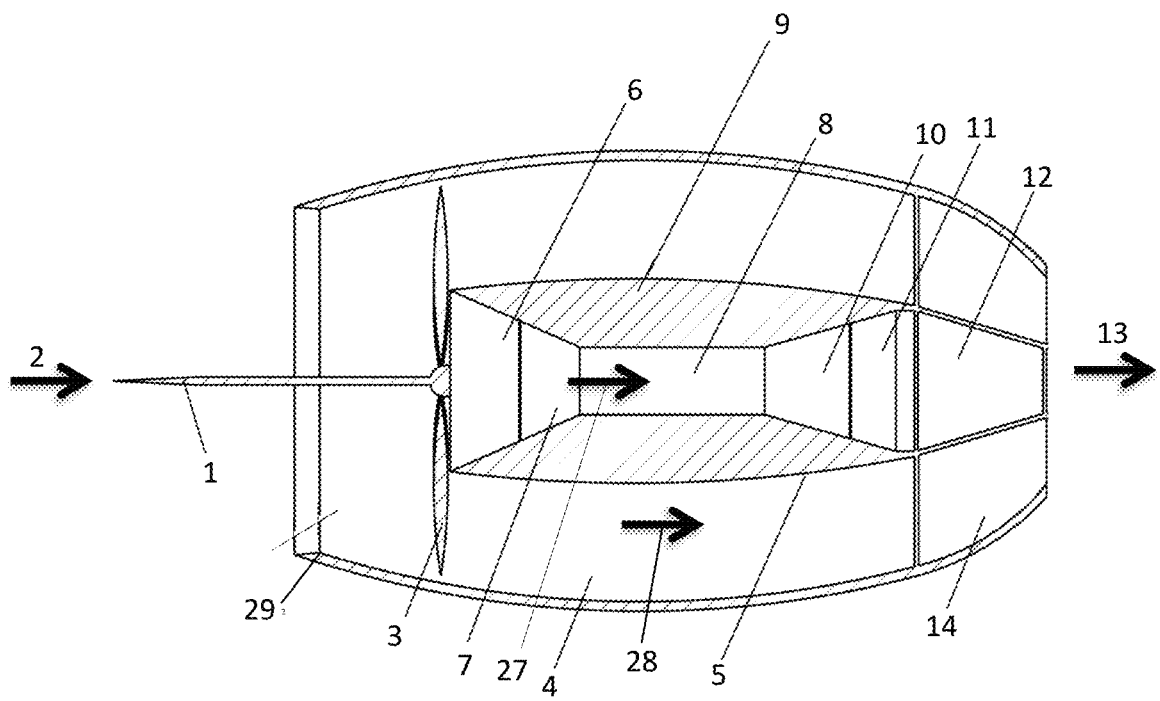
FIG. 1 illustrates

FIG. 1 shows a turbofan engine. A turbofan engine consists of a bypass fan 3 enclosed in a nacelle 29, this splits the incoming air 2 to flow through the bypass duct 4 called the bypass flow 28 and a small portion of the air flow 27 feeds into the engine core 5. The fan 3 can be directly driven or geared to the low pressure shaft 15 of the core engine. Thrust is generated when this bypass flow 28 exits through the bypass nozzle 14. The flow inside the engine core 5 undergoes a series of operations. Firstly, the fan 3 which is geared with the low pressure compressor 6 generates compression in the bypass duct 4 and the high pressure compressor 7 increases the pressure of the incoming core air 27. This core air is ignited in the core combustion chamber 8 by injecting fuel into it. The engine core duct 9 contains all of these assemblies. Post combustion, the exhaust gases drive the high pressure turbine 10 and the low pressure turbine 11. The low pressure turbine 11 drives the low pressure compressor 6 and the high pressure turbine 10 drives the high pressure compressor 7. The core exhaust gases 13 are further used to propel the engine by exiting the core exhaust nozzle 12 at high speeds. Compressed air 28 exits from bypass nozzle 14.

Figure 2:
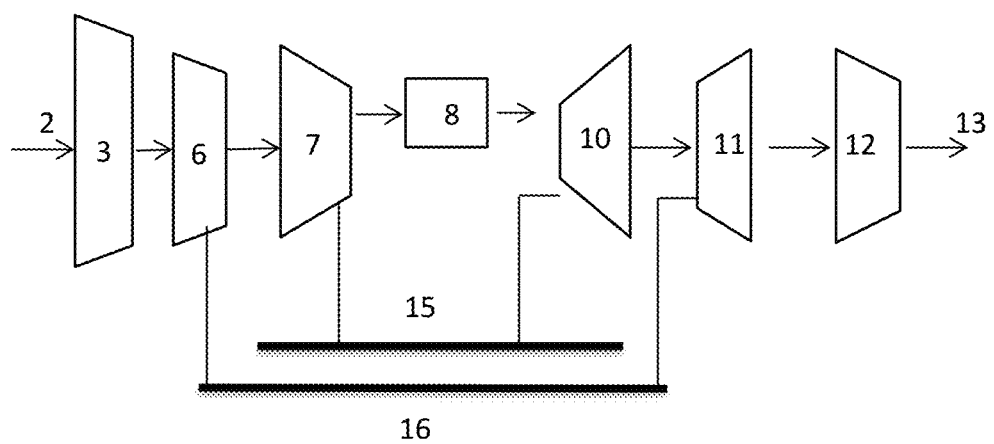
FIG. 2 illustrates shows a schematic diagram of the working of a two shaft turbofan engine, consistent with one or more exemplary embodiments of the present disclosure.

Such turbine engines are also called two shaft engines or two spool engines as can be seen in the engine schematics in FIG. 2. The high pressure compressor 7 and the high pressure turbine 10 are connected via a high pressure shaft 15. The low pressure fan compressor 3 and the low pressure turbine 11 are connected via a low pressure shaft 16. All the shafts are coaxial. The fan 3 is connected to the low pressure compressor 6 through a gear.

Some turbofan engines are called three shaft engines with one more compressor, shaft and turbine. Some turbofan engine, in addition to the above, also can possibly insert an intercooler between the low pressure compressor 6 and the high pressure compressor 7. This is in order to cool the compressed gas so as to allow further compression. In addition to the above, some engine can also possibly insert a recuperator between the high pressure compressor 7 and the combustor 8. This is done to pre-heat the compressed gas before it is combusted. The present invention is applicable to all such engines as described above.

Figure 8:
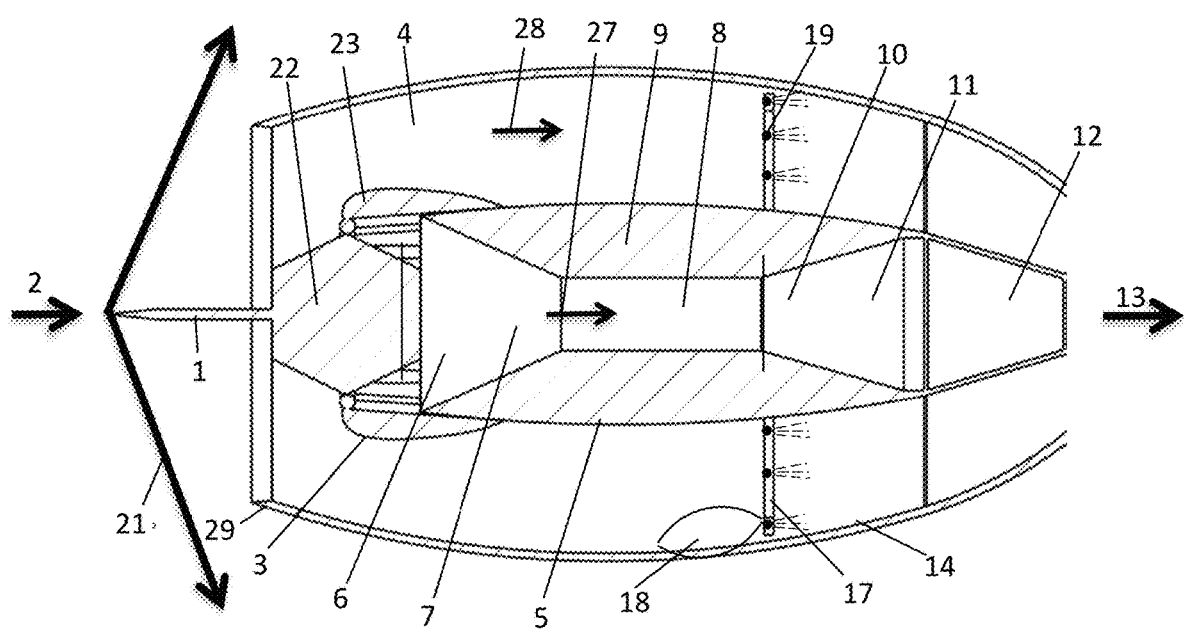
FIG. 8 shows the configuration of the engine in the supersonic and transonic conditions, consistent with one or more exemplary embodiments of the present disclosure.

In the invention in FIG. 8, at straight and level cruise, fuel supply 18 is switched on to operate the afterburner 17 and the compressed air 14 in the bypass duct 4 is combusted with the fuel in the afterburner to generate thrust and the combustion gases exit from the bypass nozzle 14. The bypass fan 3 is retracted backwards towards the core engine when the afterburner 17 is in operation so that the aeroplane can fly supersonic without obstruction to high speed airflow. The hub of the bypass fan 22 contains the folding and gearing mechanism for this retraction.

Figure 3:
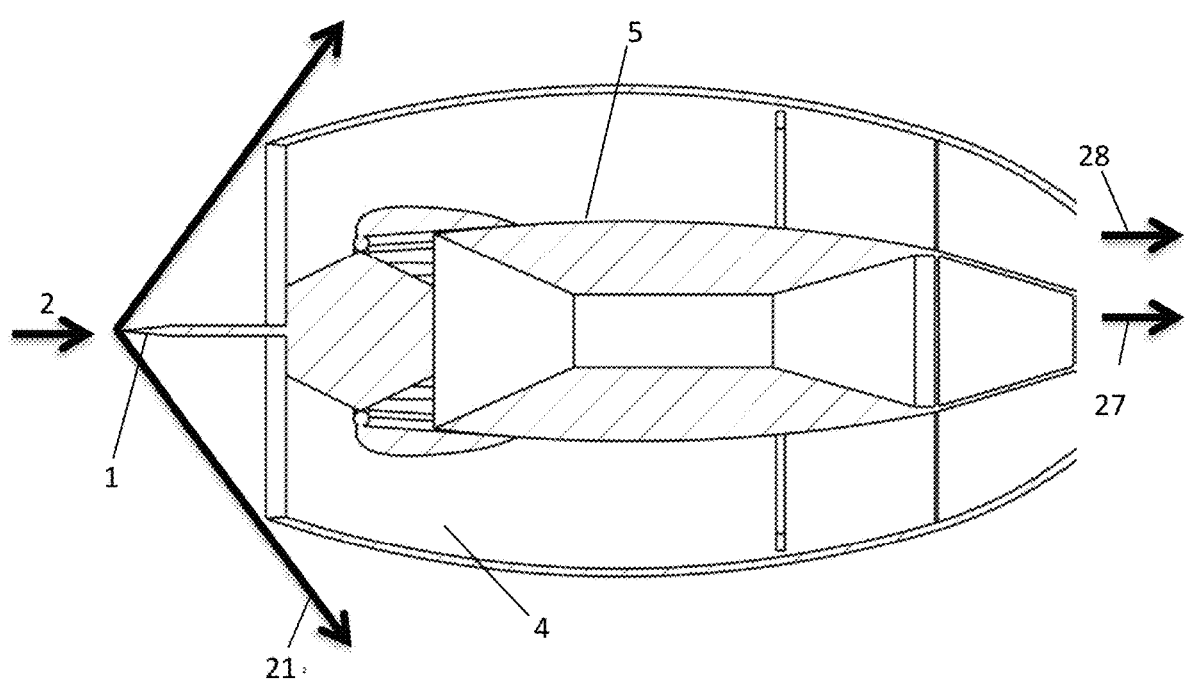
FIG. 3 shows the shockwave envelope, consistent with one or more exemplary embodiments of the present disclosure.

In FIG. 3, the shock deflection needle 1 is fixed to the geometry of the engine at the hub of the bypass fan 3 to deflect the shock waves 21 generated when the aircraft is flying at supersonic speeds. The shock deflection needle 1 can be installed at any position ahead of the engine such as for the shock waves to cross over the engine and not to enter it.

In FIG. 8, when the aircraft decelerates to sub-sonic speeds below Mach 1, the bypass fan 3 is re-opened to its standard turbofan configuration and the fuel supply to the afterburner 17 from the fuel supply 18 is cut-off. The afterburner 17 function is stopped. The engine now operates as a standard sub-sonic turbofan for the purpose of subsonic flight, descent and landing. The invention enables the engine to be switched back to subsonic flight speed at any segment of the cruise flight.

Thrust is generated both by the afterburning of the bypass flow 28 in the bypass duct that exits through the core nozzle as well as by the fuel combustion that occurs in the core engine, whereby the combusted flow exits through core nozzle 12.

In further detail, FIG. 1 shows the configuration of a two shaft turbofan engine in subsonic conditions. The intake air 2 enters the bypass fan 3 enclosed in a nacelle 29 causing air to split in the bypass duct 4 and the engine core 5. The air 28 entering the bypass duct 4 leaves through the bypass nozzle 14 whereas the air 27 entering the core engine 5 enters low pressure compressor 6 then passes through the high pressure compressor 7, then passes through the core combustor 8 where it is combusted and then drives the high pressure turbine 10, the low pressure turbine 11, passes through core nozzle 12 and then exits as core exhaust 13 to generate thrust. The core engine is located inside the core duct 9. The low pressure compressor 6 is geared to the turbofan 3. The shock pivot needle 1 is also attached to the fan 3 at the hub 22.

FIG. 2 shows a schematic diagram of the working of a two shaft turbofan engine. The intake air 2 enters the fan 3, low pressure compressor 6, high pressure compressor 7, and then it is combusted in the combustor 8. The exhaust gases leave whilst driving the high pressure turbine 10 and low pressure turbine 11. The exhausts 13 leaves after compression in the nozzle 12 for thrust. The low pressure compressor 3 and low pressure turbine 11 are connected via the low pressure shaft 16. The high pressure compressor 7 and the high pressure turbine 10 are connected via the high pressure shaft 15. Both shafts are coaxial.

FIG. 3 shows the shockwave envelope. The shock wave 21 is deflected away from the engine core 5 and the bypass duct 4 by coming in contact with the shock pivot needle 1.

Figure 4:
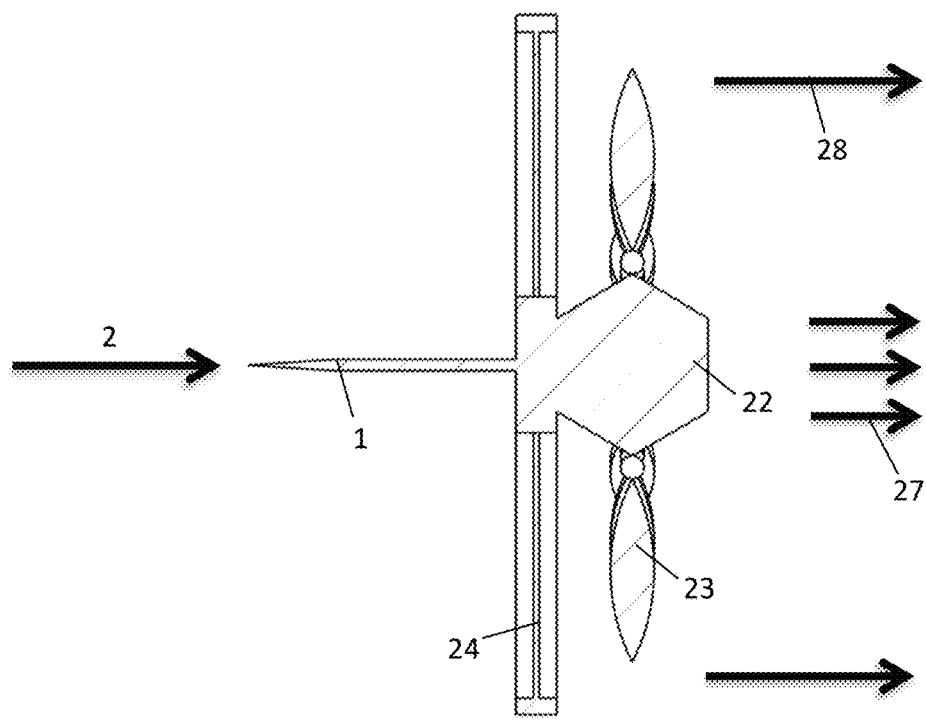
FIG. 4 shows the configuration of the fan of the engine in unfolded condition, consistent with one or more exemplary embodiments of the present disclosure.

FIG. 4 shows the configuration of the fan 3 of the engine in unfolded condition. The hub of bypass fan 22 is held by the stator 24. The blades 23 are connected to the hub via a folding and gearing mechanism. The intake air 2 is sucked into the engine which gets split into core engine air 27 and bypass air 28. The shock pivot needle 1 is also attached to hub 22 of fan 3.

Figure 5:
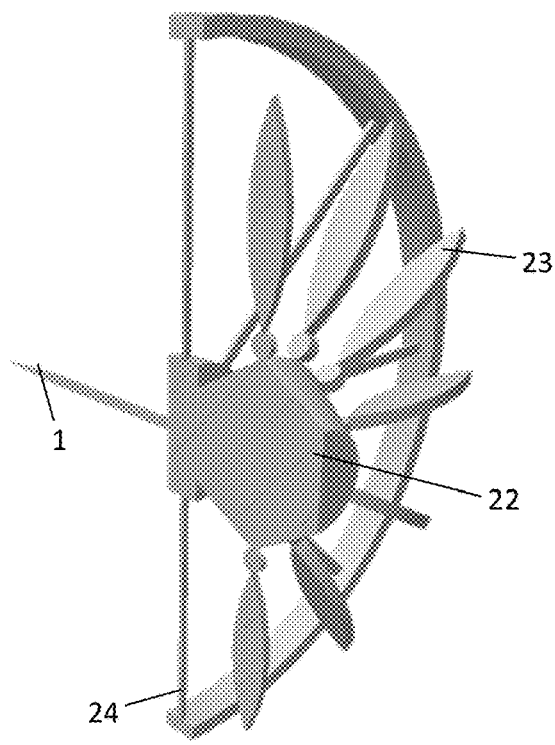
FIG. 5 illustrates an isometric three dimensional representation of the fan of the engine in unfolded condition, consistent with one or more exemplary embodiments of the present disclosure.

FIG. 5 is an isometric three dimensional representation of the fan of the engine in unfolded condition. The hub of bypass fan 22 is held by the stator 24. The blades 23 are connected to the hub 22 via a folding and gearing mechanism. The shock pivot needle 1 is also attached to fan.

Figure 6:
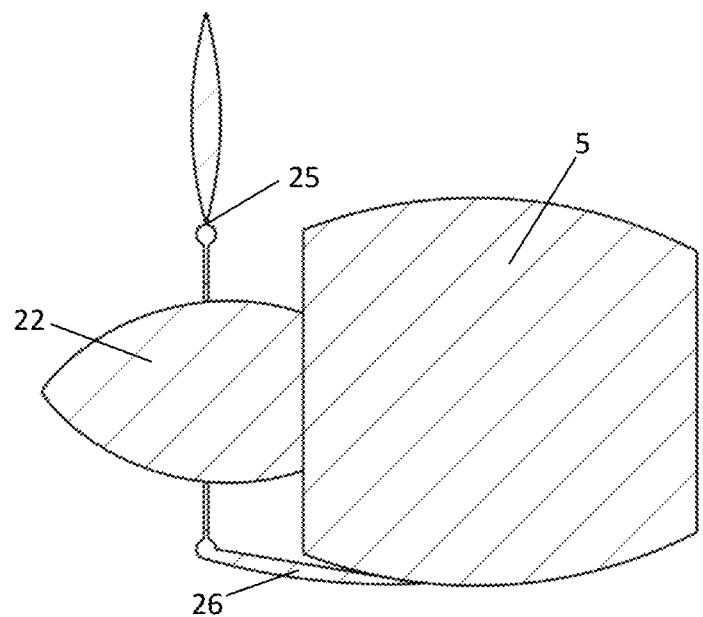
FIG. 6 illustrates a representation of engine in folded and unfolded blades, consistent with one or more exemplary embodiments of the present disclosure.

FIG. 6 shows a representation of engine in folded and unfolded blades. The hub of the bypass fan 22 is connected to all the fan blades via a folding and gearing mechanism. Unfolded blades 25 make engine operate as turbofan engine. Folded blades 26 make the engine operate as a hybrid of a turbojet and a ramjet engine.

Figure 7:
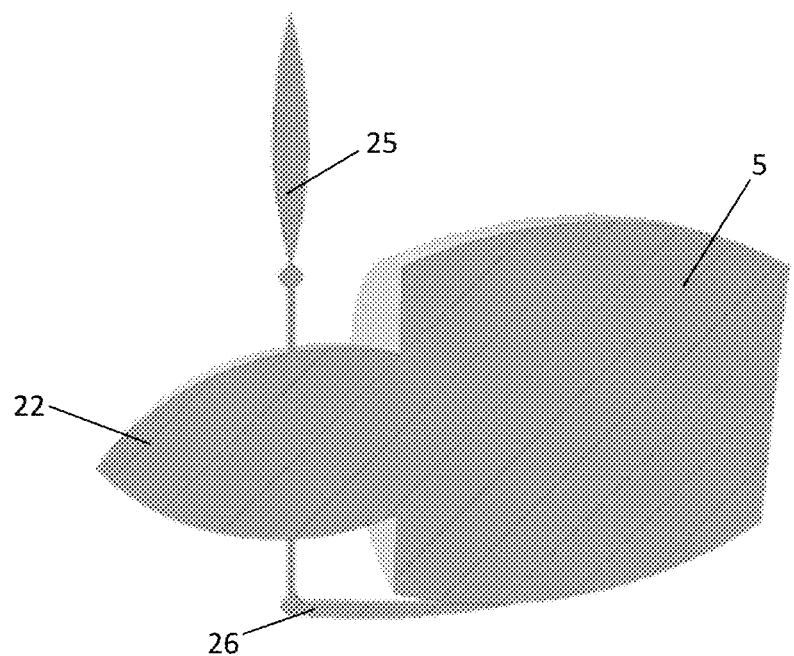
FIG. 7 illustrates an isometric three dimensional view of engine with folded and unfolded blades, consistent with one or more exemplary embodiments of the present disclosure.

FIG. 7 is a isometric three dimensional view of engine with folded and unfolded blades. The hub of the bypass fan 22 is connected to all the fan blades via a folding and gearing mechanism. Unfolded blades 25 make the engine operate as a turbofan engine. Folded blades 26 make the engine operate as a hybrid of a turbojet and a ramjet engine.

FIG. 8 shows the configuration of the engine in the supersonic and transonic conditions. Shock pivot needle 1 deflects the shock wave 21 and subsonic air 2 enters into the engine where it is split into bypass air 28 and core air 27. Core air 27 feeds into the core engine 5 which continues through the low pressure fan compressor 6, high pressure compressor 7, core combustor 8 located inside the core duct 9, high pressure turbine 10, low pressure turbine 11, core nozzle 12 and exits as core exhaust 13. The bypass duct 4 contains the bypass air 28 which is combusted with the afterburner 17 which then leaves via the bypass nozzle 14. The afterburner is fitted with a fuel supply 18 inside it. Fuel ports 19 are all around the afterburner. The fan 3 is retracted backwards towards the core engine into a cylinder using the folding and gear mechanism in the hub of bypass fan 22.

Figure 9:
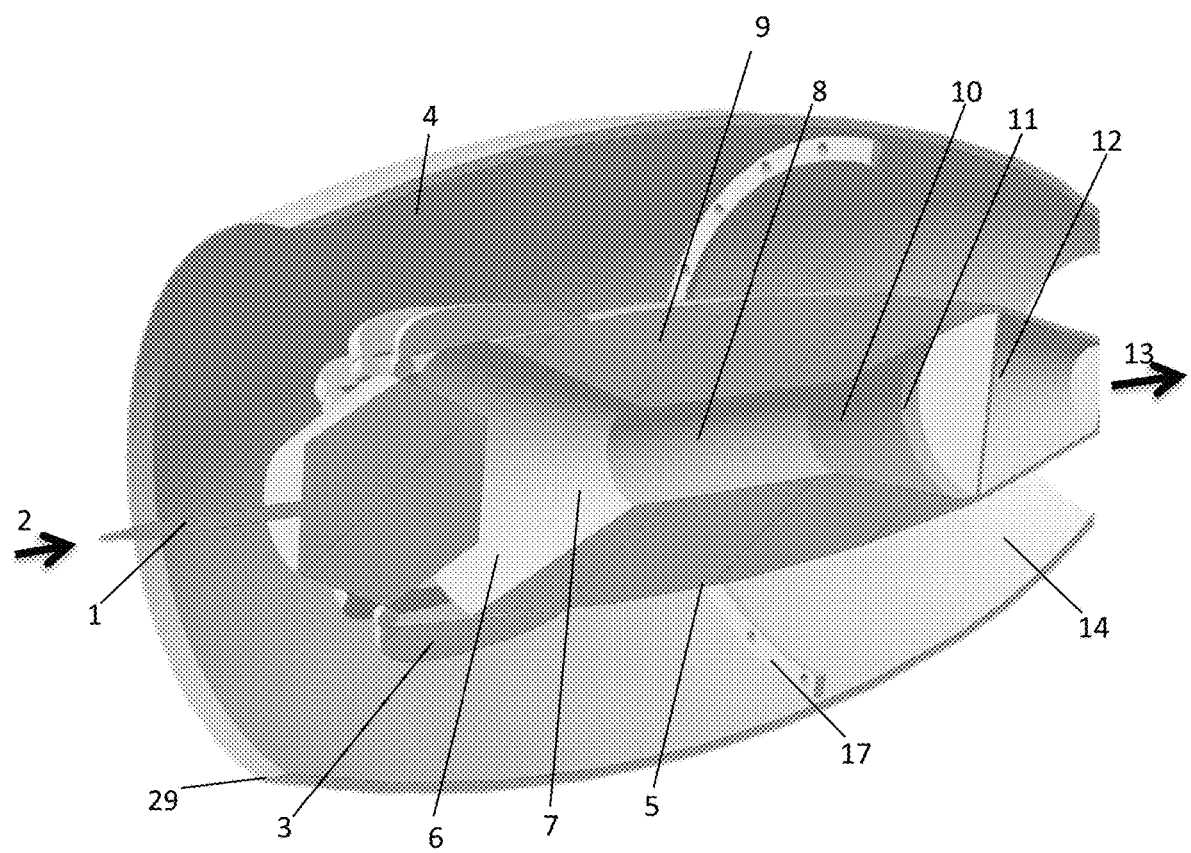
FIG. 9 shows the isometric three dimensional view of the invention in supersonic condition, consistent with one or more exemplary embodiments of the present disclosure.

FIG. 9 shows the isometric three dimensional view of the invention in supersonic condition. The airflow 2 enters after the shock is deflected by the shock pivot needle 1 and is split into bypass flow 28 and core flow 27, then passes through the retracted form of low pressure fan compressor 3. Portion of the flow 28 travels through the bypass duct 4 where it is combusted with afterburner 17 and then leaves via bypass nozzle 14. The core flow 27 enters into the high pressure compressor 7 then is combusted in combustor 8, and then it exits through the high pressure turbine 10 and the low pressure turbine 11. The exhaust 13 leaves via the exhaust nozzle 12.

In an exemplary embodiment, a turbofan engine consists of a bypass fan enclosed in a nacelle, this splits the incoming air into a bypass duct and a small portion of the air flow feeds into the engine core. Thrust is generated when this bypass flow exits through the bypass nozzle. The flow inside the engine core is performed with a series of operation. Firstly, the low pressure compressor and high pressure compressor increases the pressure of the incoming air. This air is ignited in the core combustion chamber by injecting fuel into it. The engine core duct contains all of these assemblies. Post combustion, the exhaust gases drive the low pressure turbine and the high pressure turbine. The low pressure turbine drives the low pressure compressor which is geared to the fan and the high pressure turbine drives the high pressure compressor. The core exhaust gases are further used to propel the engine with the help of the core exhaust nozzle. Such a turbine engine is also called two shaft engines or two spool engines.

In an exemplary embodiment, an exemplary turbojet engine consists of an intake nacelle which feeds incoming air into three vital components i.e. compressor, combustion chamber and turbine. The exhaust then exits into the air via an exhaust nozzle.

In contrast to the turbofan engine, the turbojet engine neither has a fan nor has any bypass air, therefore all of the intake air entering the nacelle is fed into the engine core. The compressor is driven by the turbine via the energy imparted by the combustion gases. The residual of the energy in the combustion gases is used to produce thrust. Thrust is usually enhanced by the addition of an exhaust nozzle. In addition to the above, just like the turbofan engine, turbojet engine can have one, two or three shafts on which the compressor and turbine are attached such that they have a low pressure turbine driving the low pressure compressor and a high pressure turbine driving the high pressure compressor and likewise.

In an exemplary embodiment, an afterburner adds additional fuel after the combustion gases exit the bypass nozzle, thereby creating additional combustion force. This combustion force contributes to an increase in the overall thrust of the engine on part of acceleration of exhaust gases to higher velocity and also the addition of fuel mass flow to the exhaust gases. In normal use, an afterburner can purpose to accelerate the engine sufficiently to surpass transonic regime from Mach 1 to Mach 1.7, to aid in take-off and cruise at supersonic.

In an exemplary embodiment, the concept behind supersonic aircraft is to increase the travel speed of aircraft to beyond Mach 1 in order to reduce travel times. Early supersonic aircraft used turbojet engines in order to provide the thrust required for acceleration to the supersonic regime. The problem of high noise pollution, low fuel efficiency and high operating costs lead to the cancellation of the use of turbojet engine for the supersonic applications in commercial ecosystem.

Quite recently, an emphasis has been laid on the use of low bypass turbofan engine for supersonic application as it has been found to cover the drawbacks of turbojet engine with the recent advancements of high bypass ratio to achieve less noise and higher fuel efficiency and reliability. However, to achieve the acceleration for the supersonic speed, a low to medium bypass has been suggested which can hamper the benefits of turbofan engine with reference to noise, efficiency and reliability. So far, practical applications have been found only in military aircrafts with a general achievable Mach limit of 1.7.

In an exemplary embodiment, a ramjet engine is different from the turbofan or turbojet engine in a way that it has neither any compressor nor any turbine, and thus no shaft as well. In a ramjet engine, the forward motion also known as the ram effect of engine is used to compress the incoming air. Fuel is injected at this point and the combustion gases exit through the nozzle creating thrust. This phenomenon is effective at supersonic speeds only. Hence in practice, this type of engine cannot operate on its own and requires another engine or rocket to accelerate it. Therefore, it cannot be operated at zero air speed or static conditions.

A core feature of ram jet engine is the shock pivot needle which deflects the shock waves away from the intake and prevents the shock waves from disturbing the air intake of the engine. Thus, the engine is placed behind the cone of the shockwave.

In an exemplary embodiment, Supersonic flight occurs when the aircraft is flying above Mach 1, which is the speed of sound, such that a sound pressure wave is generated because of the supersonic speed and this needs to be deflected in some way. The aircraft can fly supersonic but the intake into engine can still remain subsonic. Supersonic commercial engine usually go up to Mach 2. When the aircraft is accelerating from subsonic flight to achieve a speed above Mach 1, it is said to be in the transonic regime.

In an exemplary embodiment, Aircrafts are a pronounced source of noise pollution having a harmful effect on the local communities living in proximity of the airport and also to the people flying on the aircraft. This noise is contributed as a result of the fluctuation in pressure waves coming from the any of the mechanical parts in the engine, the airflow past the aircraft, the jet released from the engine or the mechanical vibration of the components.

The effects of noise can be felt by even the distant communities if the aircraft is flying low at high speeds or is going supersonic. Aircraft noise contributes to noise pollution on the ground. The consequences of this noise are very harmful for the environment and therefore certain organizations have made standards for the aircraft noise measured at various altitudes and distances from the airport. These certifications are different based on the type of aircraft i.e. subsonic, supersonic, weight of aircraft, propeller etc.

Though subsonic aircraft have been significantly improved to meet these noise standards, not much progress has been seen in the supersonic regime.

One main problem with the noise of the supersonic aircraft is the take-off and the landing of a supersonic engine even if it lands at sub-sonic speeds. The use of turbojet engines in the early supersonic aircraft was responsible for significant noise pollution because of high air flow in the turbojet engine and enormous sound released during jet propulsion. The high bypass turbofan engines were the direct outcome of the research on the engine noise suppression but were later found to increase thrust as well. High bypass turbofan engine used in subsonic regime cannot be used to power supersonic aircraft without reducing the bypass of air to provide sufficient thrust because of the choking of the bypass air at supersonic flight speed. In the supersonic regime, low bypass turbofan engine operate at a lower noise than the turbojet engine but the use of low bypass makes them inefficient during take-off and cruise.

Exemplary embodiments of the present disclosure intend to use medium to high bypass turbofan engine with a controllable afterburner introduced in the bypass duct in order to achieve low noise levels during take-off, climb and landing by use of the turbofan engine itself, and to achieve supersonic acceleration during cruise flight by converting the bypass duct of the turbofan engine into a ramjet engine.

In an exemplary embodiment, the intended application of an exemplary engine is civil commercial supersonic aircraft that can take-off, land and fly subsonic over land areas as a civil turbofan engine in order to meet noise compliance standards as are met by turbofan engines designed for the purpose and then cruise at supersonic speed preferably over unregulated regions at high altitudes with an increased efficiency and with reduced travel times. The invention is applicable to two spool, three spool and beyond turbofan engines. The invention employs a medium to high bypass engine as a core. The engine is designed for supersonic commercial aircraft as a prime application whereby the aircraft can meet noise regulations on ground and also travel at supersonic speeds with optimal engine efficiency. Another application could be to achieve a significantly high flight Mach number for commercial aircraft because of the ram effect incorporated within the engine through the introduction of an afterburner in the bypass duct. The invented engine can be integrated to any kind of platforms and airframes designed for supersonic flight.

Other modifications and alterations may be used in the design and manufacture of the apparatus of the present invention without departing from the spirit and scope of the accompanying claims.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

Moreover, the word "substantially" when used with an adjective or adverb is intended to enhance the scope of the particular characteristic; e.g., substantially planar is intended to mean planar, nearly planar and/or exhibiting characteristics associated with a planar element. Further use of relative terms such as "vertical", "horizontal", "up", "down", and "side-to-side" are used in a relative sense to the normal orientation of the apparatus.

What is claimed:

1. A method of operating an engine of an aircraft, said engine comprising a turbofan engine having a bypass duct, an afterburner disposed within the bypass duct to combust bypass air, a core engine having a core shaft, a bypass fan having blades and driven by the core shaft, a shock deflector needle attached to a hub of the engine, and a mechanism of fan retraction configured to retract the bypass fan into a cylindrical configuration, the method comprising:
   during a transition from a subsonic flight speed to a supersonic flight speed, disengaging the bypass fan from the core shaft, using the mechanism of fan retraction to retract the bypass fan into a cylindrical configuration by folding the blades of the bypass fan towards the core engine along pivot axes perpendicular to the longitudinal axis of the core engine, and using the afterburner to combust the bypass air in the bypass duct during supersonic flight speed; and
   during a transition from supersonic flight speed to subsonic flight speed operating the mechanism of fan retraction in reverse to return the bypass fan to a turbofan configuration to operate the engine in a subsonic flight mode.

2. A method of operating the engine as claimed in claim 1, wherein the engine is configured to carry out take-off and landing segments of a flying mission as a bypass turbofan engine.

3. A method of operating the engine as claimed in claim 1, wherein the engine operates as a bypass turbofan engine when the aircraft is flying at sub-sonic speeds.

4. A method of operating the engine as claimed in claim 1, wherein the afterburner is located nearer to an aft-end of the bypass duct upstream of a bypass nozzle.

5. A method of operating the engine as claimed in claim 1, wherein the engine converts from a turbofan engine mode to a hybrid of turbojet and ramjet engine mode during flight.

6. A method of operating the engine as claimed in claim 1, wherein using the mechanism of fan retraction to retract the bypass fan into the cylindrical configuration occurs while the Mach number remains sub-sonic and before the aircraft gains supersonic speed.

7. A method of operating the engine as claimed in claim 1, wherein the engine converts from a turbofan engine mode to a hybrid of turbojet and ramjet engine mode by activating the afterburner in the bypass duct.

8. A method of operating the engine as claimed in claim 1, wherein the afterburner burns fuel to convert the turbofan engine into a hybrid of turbojet and ramjet with two co-axial exhausts.

9. A method of operating the engine as claimed in claim 1, wherein the afterburner is configured to be turned off during flight to decelerate the plane to subsonic speeds for flying subsonic and before landing.

10. A method of operating the engine as claimed in claim 1, wherein the afterburner is started at any subsonic speed.

11. A method of operating the engine as claimed in claim 1, wherein the bypass fan is retracted into the cylindrical configuration towards the core engine perpendicular to the longitudinal axis of the core engine after the initiation of the afterburner.

12. A method of operating the engine as claimed in claim 1, wherein the shock deflector needle is extended from the hub of the bypass fan to maintain a shock wave outside a core duct and outside the bypass duct during transonic or supersonic flight.

13. A method of operating the engine as claimed in claim 1, wherein the bypass fan is retracted into the cylindrical configuration before the aircraft enters a sonic regime and attains sonic speed or enters a transonic regime.

14. A method of operating the engine as claimed in claim 1, wherein the afterburner initiation in the bypass duct, and the bypass fan retraction into the cylindrical configuration enable the engine to act as a hybrid of turbojet and ramjet engine that provides thrust.

15. A method of operating the engine as claimed in claim 1, wherein the bypass fan is dis-engaged from the core shaft after the bypass fan is retracted into the cylindrical configuration.

16. A method of operating the engine as claimed in claim 1, wherein the bypass fan is not driven by the core turbine after dis-engagement from the core shaft.

17. A method of operating the engine as claimed in claim 1, wherein the core engine provides additional thrust at supersonic speed after being dis-engaged from the bypass fan.

18. A method of operating the engine as claimed in claim 1, wherein for the engine to decelerate to subsonic speed the bypass fan is retracted forward into a subsonic configuration and re-engaged with the core shaft.

19. A method of operating the engine as claimed in claim 1, wherein the afterburner is turned off for the engine to decelerate to subsonic speed.

20. A method of operating the engine as claimed in claim 1, wherein the shock deflection needle can be installed at any forward position ahead of the engine.

21. A method of operating the engine as claimed in claim 1, wherein the core engine is a turbojet engine that can be completely shut down in order to achieve any Mach number above 1 such that the engine operates as a ramjet.

* * * * *